(12) United States Patent
Artigalas et al.

(10) Patent No.: US 6,434,107 B1
(45) Date of Patent: Aug. 13, 2002

(54) OPTICAL DISK COMPATIBLE WITH TWO DIFFERENT READING SYSTEMS

(75) Inventors: Max Artigalas, Le Chesnay (FR); Stephan Thies, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/011,915

(22) PCT Filed: Jun. 17, 1997

(86) PCT No.: PCT/FR97/01090
§ 371 (c)(1),
(2), (4) Date: Feb. 17, 1998

(87) PCT Pub. No.: WO98/00842
PCT Pub. Date: Jan. 8, 1998

(30) Foreign Application Priority Data

Jun. 28, 1996 (FR) .............................................. 96 08056

(51) Int. Cl.⁷ ................................................. G11B 7/24
(52) U.S. Cl. ............ 369/275.1; 428/64.1; 428/694 ML
(58) Field of Search .......................... 369/275.1, 275.2, 369/275.3, 275.4, 13, 288, 283, 284, 13.35, 13.38, 13.39, 13.41, 13.42, 13.55; 428/64.1, 64.2, 64.4, 64.7, 694 ML, 694 SC

(56) References Cited

U.S. PATENT DOCUMENTS

| 3,855,426 A | 12/1974 | Bouwhuis ................. 179/100.3 |
| 5,526,338 A | 6/1996 | Hasman et al. .............. 369/109 |
| 5,540,966 A * | 7/1996 | Hintz ......................... 428/64.1 |
| 5,696,754 A | 12/1997 | Nishizawa ................ 369/275.1 |
| 5,708,652 A * | 1/1998 | Ohki et al. ............... 369/275.1 |
| 5,732,065 A | 3/1998 | Braat et al. ............... 369/275.1 |
| 5,766,717 A | 6/1998 | Kaneko et al. ............. 428/64.1 |
| 5,828,648 A | 10/1998 | Takasu et al. ............ 369/275.1 |
| 5,876,823 A * | 3/1999 | Nagashima ................ 428/64.1 |
| 5,914,926 A | 6/1999 | Maeno et al. ................. 369/54 |
| 5,966,367 A | 10/1999 | Takasu et al. ............ 369/275.1 |
| 5,989,670 A | 11/1999 | Kaneko et al. ............. 428/64.1 |
| 6,014,364 A | 1/2000 | Takasu et al. ............ 369/275.1 |

FOREIGN PATENT DOCUMENTS

| EP | 368442 | 5/1990 |
| EP | 520619 | 12/1992 |
| EP | 720159 | 3/1996 |
| EP | 737966 | 10/1996 |
| EP | 745985 | 12/1996 |
| GB | 2017379 | * 10/1979 |
| WO | 97/09716 | 3/1997 |

* cited by examiner

*Primary Examiner*—Ali Neyzari
(74) *Attorney, Agent, or Firm*—Joseph S. Tripoli; Paul P. Kiel

(57) ABSTRACT

An optical disc comprising two elementary discs glued to each other by a transparent glue layer. The first elementary disc comprises an information surface according to DVD standard and the second elementary disc comprises an information surface according to CD standard. The present optical disc may be read by a CD player for CD information and by a DVD player for DVD information. The problem of costs and other difficulties for ascending compatibility of DVD players is therefore solved while assuring a simple and smooth transition from CD discs to DVD discs for consumers.

8 Claims, 4 Drawing Sheets

OPTICAL DISK COMPATIBLE WITH TWO DIFFERENT READING SYSTEMS

BACKGROUND OF THE INVENTION

1. Field of the Invention

The present invention relates to an optical disc composed of two elementary discs adhesively bonded one to the other, each elementary disc containing at least one transparent substrate with an information face provided with surface micro-alterations distributed over a spiral track or concentric tracks and intended to be read optically with the aid of a laser beam.

2. Related Art

Currently, a new standard of high-density optical disc is being devised under the name DVD (Digital Video Disc). A specifically developed technique enables this new type of optical disc to have a storage capacity of greater than 4.7 Giga Bytes per information face, thus making it possible to store over two hours of digital video compressed according to the MPEG2 Video standard. Applications in the field of information processing are also made possible by the high density of the optical disc.

The increase in the density of storage on optical disc has necessitated a change of technique as compared with the compact disc (CD) technology, especially as regards the size of the micro-alterations on the disc, the wavelength of the reading laser, the system of modulation and the method of error correction. As a result of this, a reader of the DVD disc does not a priori allow the reading of conventional compact discs.

The compact disc is around 1.2 mm thick and consists of a transparent substrate including an information face provided with micro-alterations in the form of micro-pits or micro-ridges distributed over a spiral track. The information face is covered with a reflecting metallic layer which is covered in turn with a protective layer on the outer face of which is then affixed a label indicating the contents of the disc. The DVD disc is composed of two elementary discs each around 0.6 mm thick. The two elementary discs are adhesively bonded back to back, on the side of their respective information face if present, by a fine layer of adhesive, this resulting in a disc around 1.2 mm thick. For optical reading, the thickness of the substrate traversed by the laser beam is 1.2 mm and 0.6 mm respectively for the compact disc and for the DVD disc.

The compact disc technique uses EFM modulation, the CIRC error correcting code and the reading wavelength $\gamma=780$ nm, whereas the DVD technique uses 8/16 modulation, the RSPC error correcting code and the reading wavelength $\gamma=650$ nm or 635 nm. Thus, a reader designed uniquely for the DVD disc is not compatible in respect of the reading of compact discs. To ensure upward compatibility enabling the DVD reader to read compact discs, an electronic unit and a laser source which are dedicated to the reading of compact discs have to be included in the DVD reader, this substantially increasing the price of such readers. Furthermore, although the upward compatibility of DVD readers enables compact discs to be read, such is not the case for the readers of conventional compact discs which cannot in any event read DVD discs since such readers do not include an electronic unit and a laser which are specific to the reading of DVD discs.

BRIEF SUMMARY OF THE INVENTION

The objective of the present invention is to solve this problem of compatibility in respect to the reading of compact discs and DVD discs while proposing a simple and economical solution.

The invention proposes a novel type of optical disc which combines the advantages of compact discs and DVD discs and can be read equally by compact disc readers and DVD readers.

The invention also proposes a method of manufacturing this novel type of optical disc.

The optical disc according to the invention is composed of two elementary discs assembled by adhesive bonding of one to the other, each elementary disc containing a transparent substrate with at least one information face provided with surface micro-alterations distributed over a spiral track or concentric tracks and intended to be read with the aid of a laser beam. The micro-alterations may be in the form of micro-pits, micro-ridges and/or continuous grooves. The information face of the first elementary disc is coated with a semi-reflecting layer adjacent to the assembling adhesive layer which is transparent. The information face of the second elementary disc is coated with a reflecting metallic layer and is situated opposite the assembling adhesive layer. A protective layer subsequently covers the reflecting metallic layer of the second disc so as to serve to support a label for the disc. The semi-reflecting layer has a coefficient of transmission greater than or equal to a first predetermined value for a wavelength of the laser greater than or equal to a first threshold. The semi-reflecting layer furthermore has a coefficient of reflection greater than or equal to a second pre-determined value for a wavelength of the laser less than or equal to a second threshold. Preferably, the first threshold is greater than the second threshold by at least 100 nm.

Advantageously, the information face of the first elementary disc and the information face of the second elementary disc comply with two different standards, for example DVD or CD.

Preferably, the first predetermined value for the coefficient of transmission is equal to 95%. The second predetermined value for the coefficient of reflection is equal to 25%. For the application of the optical disc within the framework of CD and DVD compatibility, the wavelengths used are of the order of 780 nm for the first threshold and of the order of 650 nm for the second threshold, and the overall thickness of the disc is 1.2 mm.

A secondary information face of the second elementary disc, adjacent to the assembling adhesive layer, can be produced on the face opposite the reflecting metallic layer. The secondary information face is coated with a semi-transparent layer which has similar characteristics to the semi-reflecting layer of the first elementary disc versus the wavelength of the laser, and must not substantially impair normal reading of the semi-reflecting layer and of the reflecting layer.

BRIEF DESCRIPTION OF THE DRAWINGS

The invention will be better understood with the aid of the detailed description of a few embodiments taken by way of non-limiting example and illustrated by the appended drawings in which.

DETAILED DESCRIPTION OF THE INVENTION

Figure 1:
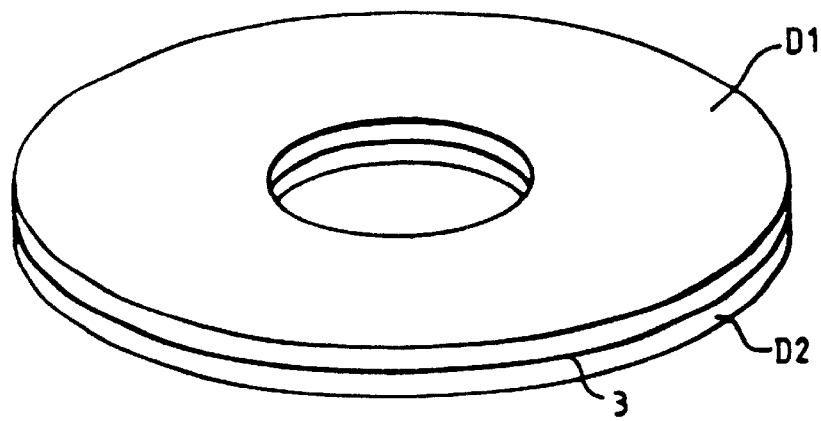
FIG. 1 is a diagrammatic perspective view of an optical disc according to the invention.

As illustrated in FIG. 1, the optical disc of the invention is composed of two elementary discs D1 and D2 assembled the one to the other with the aid of a transparent adhesive layer 3. Hereafter is the description reference will be made to the CD and DVD standards so as to facilitate the understanding of the invention without this constituting any limitation in respect of other applications or other standards of optical discs. In the particular application in order to ensure the compatibility of the disc with the CD and DVD standards, the two elementary discs D1 and D2 each have a thickness of around 0.6 mm. The diameter of the optical disc is 8 cm or 12 cm. The total thickness of the disc is around 1.2 mm.

Figure 2:
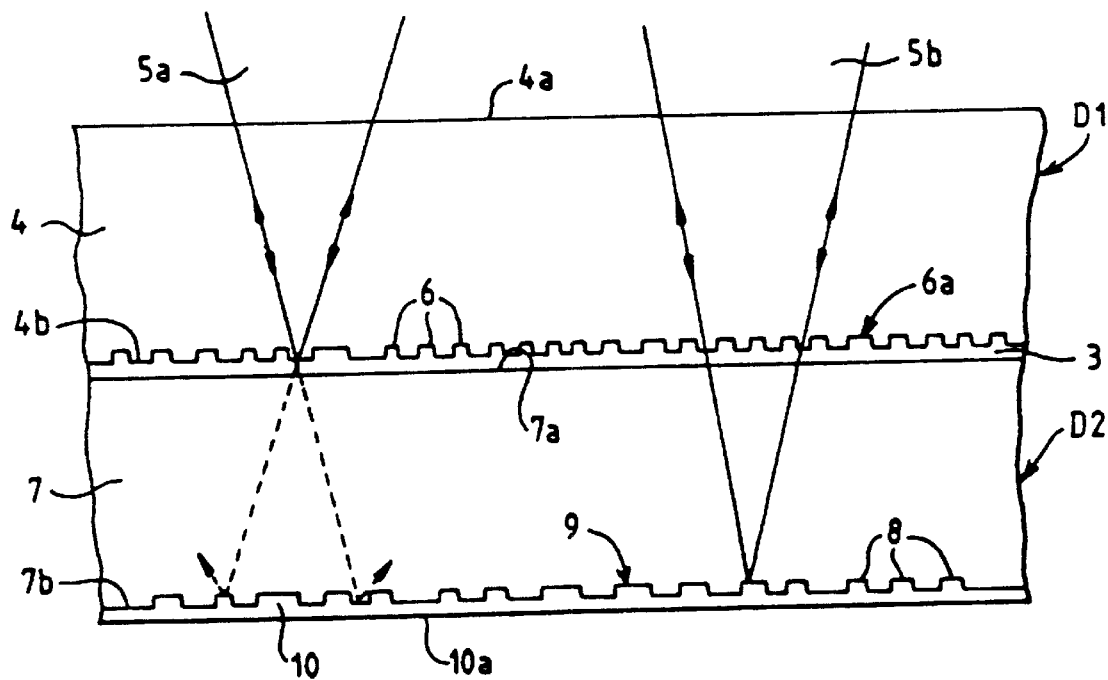
FIG. 2 is a detail view in section through the optical disc of FIG. 1 according to a first embodiment of the invention.

FIG. 2 illustrates diagrammatically the structure of the disc according to a first embodiment of the invention. The first elementary disc D1 and the second elementary disc D2 are assembled the one to the other by the transparent adhesive layer 3. The elementary disc D1 consists of a transparent substrate layer 4 around 0.6 mm thick. The upper face 4a of the transparent substrate 4 receives a reading laser beam 5a or 5b. The lower face 4b or information face of the substrate 4 includes micro-alterations 6 in the form of micro-pits or micro-ridges and is coated with a semi-reflecting layer 6a. The micro-alterations 6 are distributed over a spiral track or over concentric tracks. Likewise, the second elementary disc D2 includes a transparent substrate 7 whose upper face 7a is adhesively bonded to the information face 4b of the first elementary disc D1 with the aid of the transparent adhesive layer 3. The lower face 7b or information face of the transparent substrate 7 includes a second series of micro-alterations 8 coated with a reflecting metallic layer 9. The reflecting metallic layer 9 is subsequently covered with a protective layer 10 whose outer face 10a can serve to support a label or other printed or stuck-on indicating items relating to the contents of the disc. The second elementary disc D2 has a thickness of around 0.6 mm. Given the small thickness of the adhesive layer 3, the overall thickness of the optical disc is around 1.2 mm.

The information face 4b of the first elementary disc D1 produced according to the DVD standard and coated with the semi-reflecting layer 6a is intended to be read optically by the laser beam 5a with a wavelength γ=650 nm or 635 nm. The laser beam 5a contacts the first elementary disc D1 via the upper face 4a of the transparent substrate 4, then traverses the thickness of the transparent substrate 4 and is focused on the information face 4b. Part of the laser beam 5a is reflected by the semi-reflecting layer 6a so as to be read optically by photodetectors (not represented) and to generate information via the reader (not represented). Another part of the laser beam 5a traverses the semi-reflecting layer 6a. If the absorption of the laser beam by the semi-reflecting layer 6a is neglected, the sum of the coefficient of transmission and of the coefficient of reflection of the layer 6a is equal to 1. The laser beam 5a transmitted by the semi-reflecting layer 6a traverses in succession the transparent adhesive layer 3 and the transparent substrate 7 before being reflected by the information face 7b of the second elementary disc 2 coated with the reflecting metallic layer 9. Given the numerical aperture of the objective of the reader (not represented (in respect of the laser beam 5a, the light spot created by the laser beam 5a on the information face 7b of the second elementary disc is relatively large and unfocused. Thus, the light beam reflected by the reflecting layer 9 is strongly diffracted by the information face 7b before again being filtered by the semi-reflecting layer 6a and then subsequently reemerging from the disc via the face 4a of the first elementary disc. Any disturbances to the optical reading of the semi-reflecting layer 6a are thus minimized.

Figure 3:
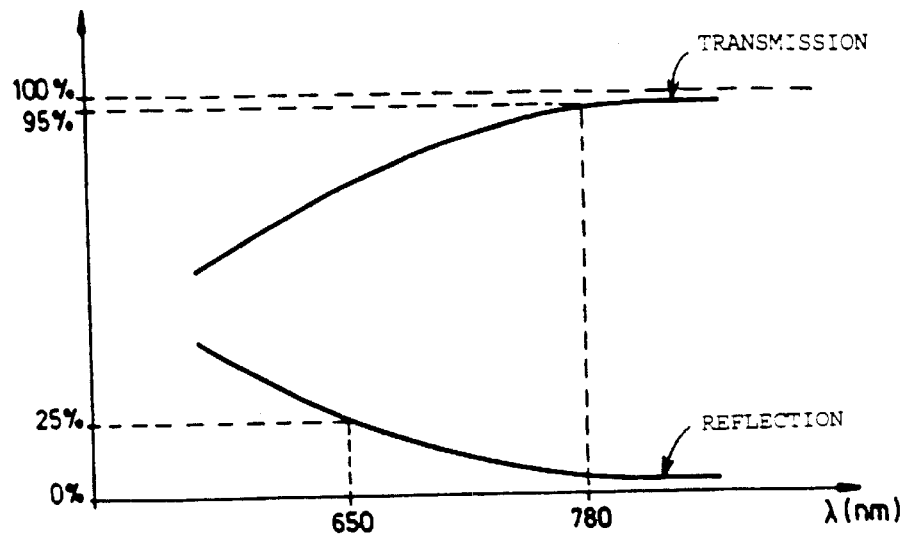
FIG. 3 is a characteristic curve of a semi-reflecting layer according to the invention.

A laser beam 5b which has a wavelength of 780 nm is used for reading the information face 7b produced according to the CD standard. For this wavelength, the semi-reflecting layer 6a has a large coefficient of transmission so as to minimize the energy losses of the laser beam intended for reading the information face 7b of the second elementary disc D2. The laser beam 5b is focused on the information face 7b and is reflected by the reflecting metallic layer 9. The reflected beam again traverses the semi-reflecting layer 6a and travels toward the objective of the reader (not represented). It is important that the presence of the semi-reflecting layer 6a does not impair the quality of optical reading of the information face 7b. In practice, the semi-reflecting layer 6a has a coefficient of reflection of greater than or equal to 25% for wavelengths of less than or equal to 650 nm and a coefficient of transmission greater than or equal to 95% for wavelengths of greater than or equal to 780 nm (see FIG. 3).

Figure 4:
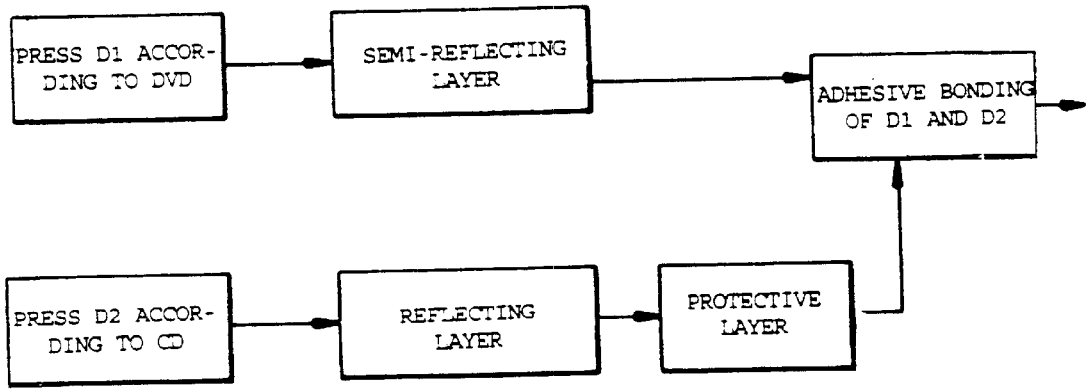
FIG. 4 is a schematic diagram in respect of the manufacture of the disc according to the embodiment of FIG. 2.

FIG. 4 illustrates diagrammatically the process for manufacturing the optical disc according to the invention. The first elementary disc D1 and the second elementary disc D2 are produced on two parallel production lines. The elementary disc D1 is produced by pressing a transparent substrate with the aid of a DVD-standard mould so as to fashion a substrate around 0.6 mm thick which includes an information face according to the DVD standard. A semi-reflecting layer is then deposited on the information face thus produced. Likewise, the second elementary disc D2 is obtained by pressing a transparent substrate with the aid of a mould so as to fashion a substrate around 0.6 mm thick and having an information face according to the CD standard. The information layer thus obtained is then coated with a reflecting metallic layer and a protective layer. The two elementary discs D1 and D2 thus obtained are assembled the one to the other with the aid of a slender transparent adhesive layer, the semi-reflecting layer being adjacent to the adhesive layer whereas the reflecting layer is situated on the opposite face to the face which receives the adhesive. The disc thus obtained included a DVD information face with a depth of 0.6 mm and a CD information face with a depth of around 1.2 mm.

Figure 5:
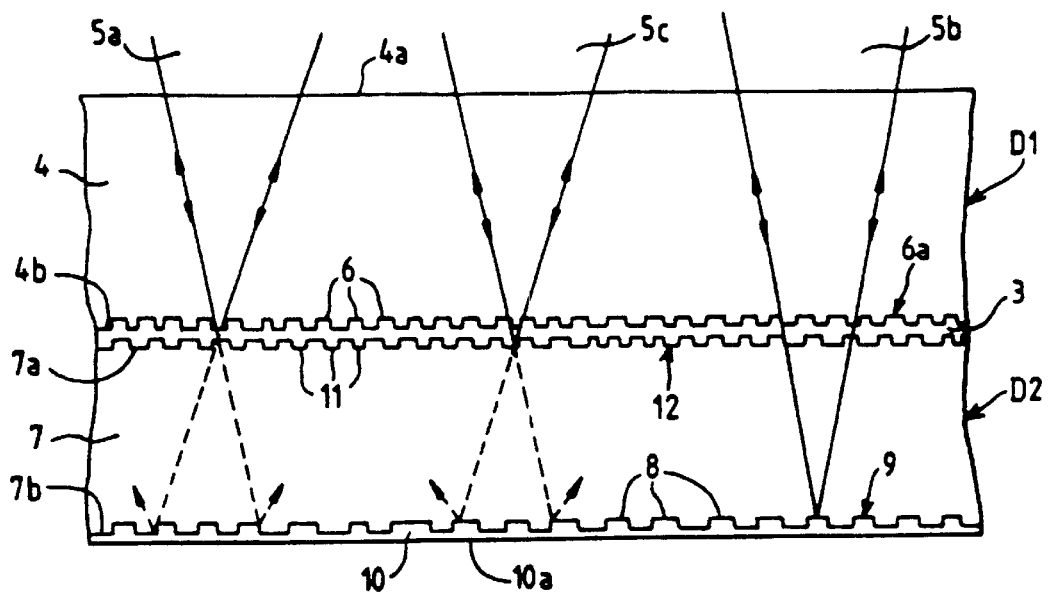
FIG. 5 is a detail view in section through the optical disc of FIG. 1 according to a second embodiment of the invention, FIG. 6 are two characteristic curves of a semi-reflecting layer and of a semi-transparent layer according to the invention.

Represented in FIG. 5 is a second embodiment of the disc which differs from the first embodiment by the addition of a secondary information face 7a on the second elementary disc D2. The disc according to FIG. 5 is in all other respects comparable to the disc described earlier while referring to FIG. 2. Here, the same reference numerals are simply reused to designate the same elements of the disc. Only the difference in this second embodiment with respect to the first embodiment is described below.

Secondary information face 7a is produced on that face of the transparent adhesive layer 3 and is opposite the information face 7b of the second elementary disc D2. The secondary information face 7a also includes micro-alterations 11 similar to those of the information face 4b of the first elementary disc D1, in the sense that they are intended to be read according to the DVD standard as opposed to the information face 7b of the second elementary disc D2 which is intended to be read according to the CD standard. The secondary information face 7a is coated with a semi-transparent layer 12 which is practically transparent in respect of the wavelength 780 nm and which has a coefficient of reflection greater than or equal to 45% in respect of wavelengths of less than or equal to 45% in respect of wavelengths of less than or equal to 650 nm. Thus, if it is considered that the energy of the light beam arriving at the reader optical detectors (not represented) should be greater than or equal to 25% of the energy of the incident laser beam 5c, the coefficient of reflection of the information face 4b of the first elementary disc 4 in respect of lengths of less than or equal to 650 nm should be greater than or equal to 25%. This implies that the coefficient of transmission of the semi-reflecting layer 6a is less than or equal to 75%. To compensate for this, the coefficient of reflection of the semi-transparent layer 12 should be greater than or equal to 45%. Therefore, the laser beam 5c focused on the secondary information face 7a for the reading thereof has a part having traversed the semi-transparent layer 12 of lower energy than compared with the first embodiment, thus further minimizing the disturbances related to the return of the laser beam reflected by the reflecting metallic layer 9 of the second elementary disc D2.

Figure 6:
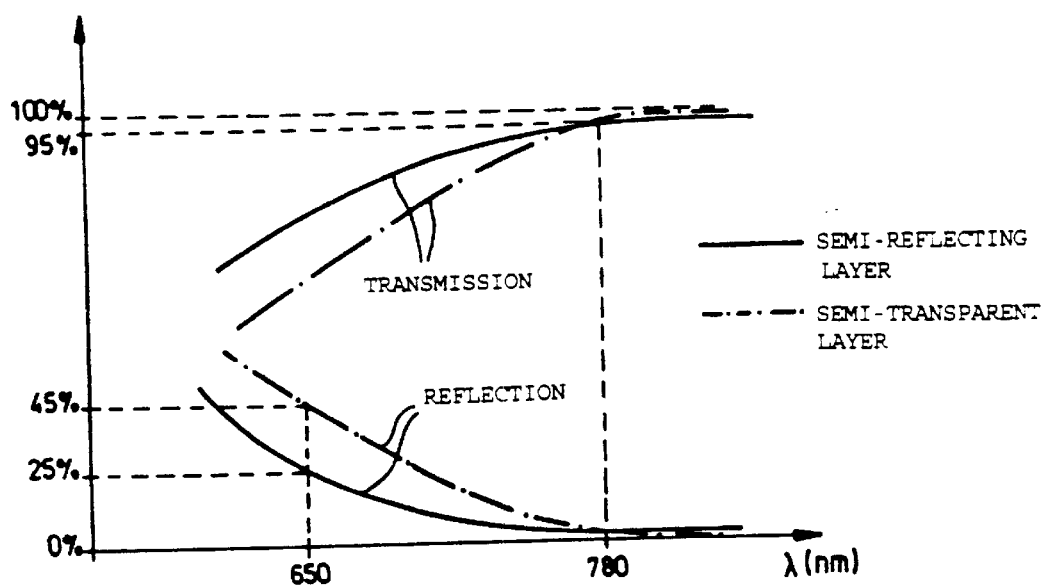

Illustrated in FIG. 6 are two characteristic curves of the semi-reflecting layer 6a and the semi-transparent layer 12.

Figure 7:
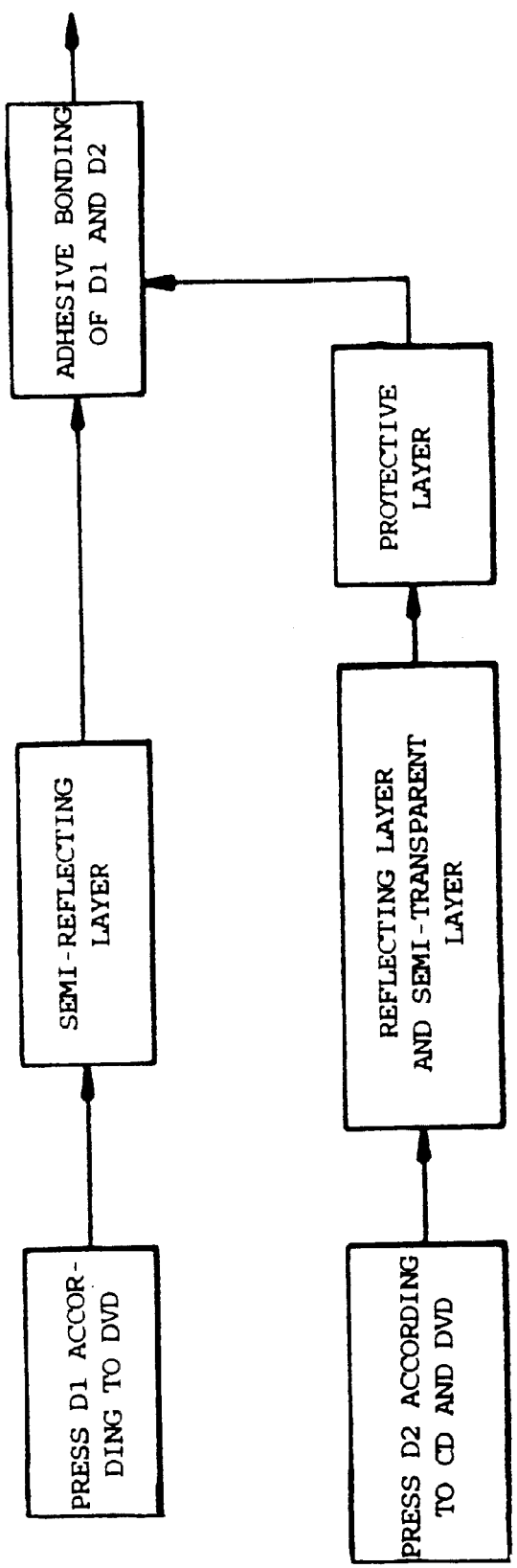
FIG. 7 is a schematic diagram in respect of the manufacture of the disc according to the embodiment of FIG. 5.

Reference will be made to FIG. 7, which depicts the manufacturing steps, in order to produced the optical disc of FIG. 5. Two parallel lines are intended to produce the elementary discs D1 and D2. The manufacture of the elementary disc D1 is identical to the process described in respect of FIG. 4. For the manufacture of the elementary disc D2, a transparent substrate is pressed via a mould so as to produce two information faces according to the DVD and CD standards respectively. A semi-transparent layer is then deposited on the DVD information face and a reflecting metallic layer on the CD information face. The reflecting layer is then covered with a protective layer. The elementary discs D1 and D2 thus produced are bonded together with a transparent adhesive, the information faces produced according to the DVD standard are bonded face to face. The optical disc is thus produced including two DVD information layers and one CD information layer, thus increasing the storage capacity of the disc.

The semi-reflecting layer 6a and the semi-transparent layer 12 can be produced using materials such as polydi-acetylene or cholesteric polymer (be thin-layer deposition for example) whose spacing may be adapted so as to change the reflecting and transmission characteristics as a function of the wavelength of light.

By virtue of the invention, existing hardware for producing CD discs and DVD discs can be used to produce, at low cost, an optical disc which is equally compatible in respect of DVD readers as in respect of CD readers without it being necessary to produce a CD compatible DVD reader. This novel type of disc makes it possible to reconcile the practical concerns of consumers regarding compatibility between CD discs and DVD discs, and furthermore to create new markets for the disc for example: a film score or a concert recorded in stereo on the CD information face and recorded in Digital Surround Dolby AC-3 on the DVD information face; an audio album on the CD information face and the associated video clips on the DVD information face or faces; all the songs by a singer on the DVD information face or faces and their 20 best known songs on the CD information face; a film on the DVD information face or faces and the original track or musical excerpt from the film on the CD information face, etc.

What is claimed is:

1. Optical disc, comprising:
    first and second elementary discs adhesively bonded to each other, each of the elementary discs containing at least one transparent substrate and an information face provided with surface micro-alterations distributed over a spiral track or concentric tracks, wherein the information face of the first elementary disc is coated with a semi-reflecting layer adjacent to a transparent assembling adhesive layer, the information face of the second elementary disc is coated with a reflecting metallic layer and is situated opposite the transparent assembling adhesive layer, and the semi-reflecting layer has a coefficient of transmission greater than or equal to 95% for a wavelength of a laser greater than or equal to a first threshold and a coefficient of reflection greater than or equal to 25% for a wavelength of a second laser less than or equal to a second threshold, the first threshold being greater than the second threshold by at least 100 nm.

2. Optical disc according to claim 1, wherein the information faces of the first and second elementary discs are produced according to two mutually different standards.

3. Optical disc according to claim 1, wherein the information face of the first elementary disc is produced according to the DVD standard and the information face of the second elementary disc is produced according to the CD standard, and in that the first and second elementary discs each have a thickness of around 0.6 mm.

4. Optical disc according to claim 1, wherein the second elementary disc includes a secondary information face disposed adjacent to the transparent assembling adhesive layer and coated with a semi-transparent layer.

5. Optical disc according to claim 4, wherein the semi-transparent layer has a coefficient of reflection greater than or equal to 45% for a wavelength of second laser less than or equal to the second threshold, and a coefficient of transmission greater than or equal to 95% for a wavelength of the laser greater than or equal to the first threshold.

6. Optical disc according to claim 1, wherein the semi-reflecting layer of the first elementary disc or the semi-transparent layer of the second elementary disc is produced with the aid of a thin-layer deposition of polydiacetylene or of cholesteric polymer.

7. Process for manufacturing an optical disc, comprising the steps of:

producing a first elementary disc by pressing a first transparent substrate to fashion an information face according to a first standard, the information face being coated with a semi-reflecting layer having a coefficient of transmission greater than or equal to 95% for a wavelength of a laser greater than or equal to a first threshold and a coefficient of reflection greater than or equal to 25% for a wavelength of a second laser less than or equal to a second threshold, the first threshold being greater than the second threshold by at least 100 nm;

producing a second elementary disc by pressing a second transparent substrate to fashion a second information face according to a second standard, the second information face being coated with a reflecting metallic layer and then protected by a protective layer; and adhesively bonding the two elementary discs to each other, wherein the information face of the first elementary disc is adjacent the transparent adhesive layer and the second information face of the second disc is opposite the adhesive layer.

8. Process according to claim 7, wherein the step of producing the second elementary disc comprises pressing the secondary information face on the transparent substrate according to the first standard, the secondary information face being coated with a semi-transparent layer before the operation of assembling with the first elementary disc.

* * * * *